May 13, 1941. D. W. SMITH 2,241,890
DOUGH DIVIDER
Filed Feb. 24, 1940 5 Sheets-Sheet 1
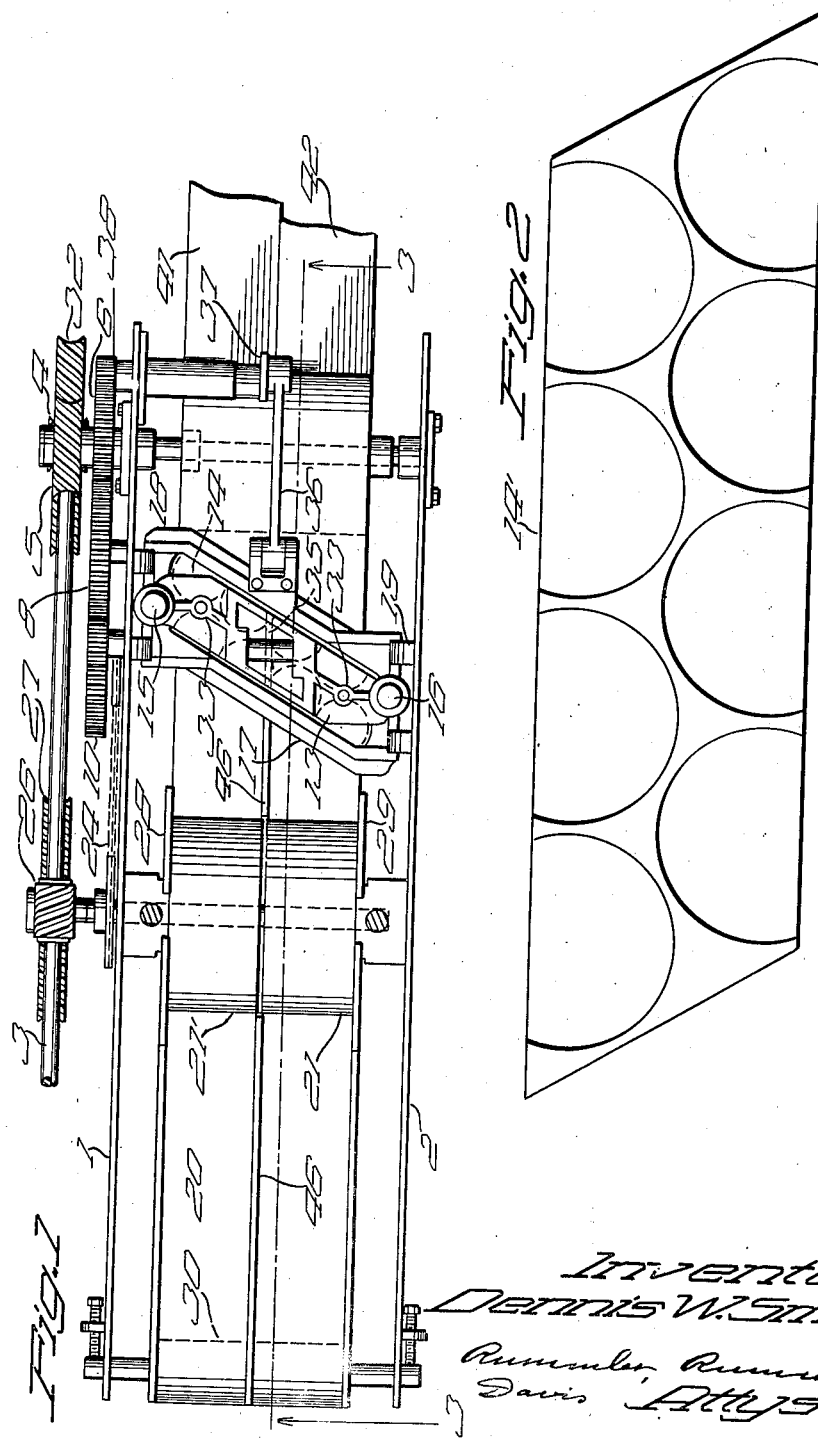

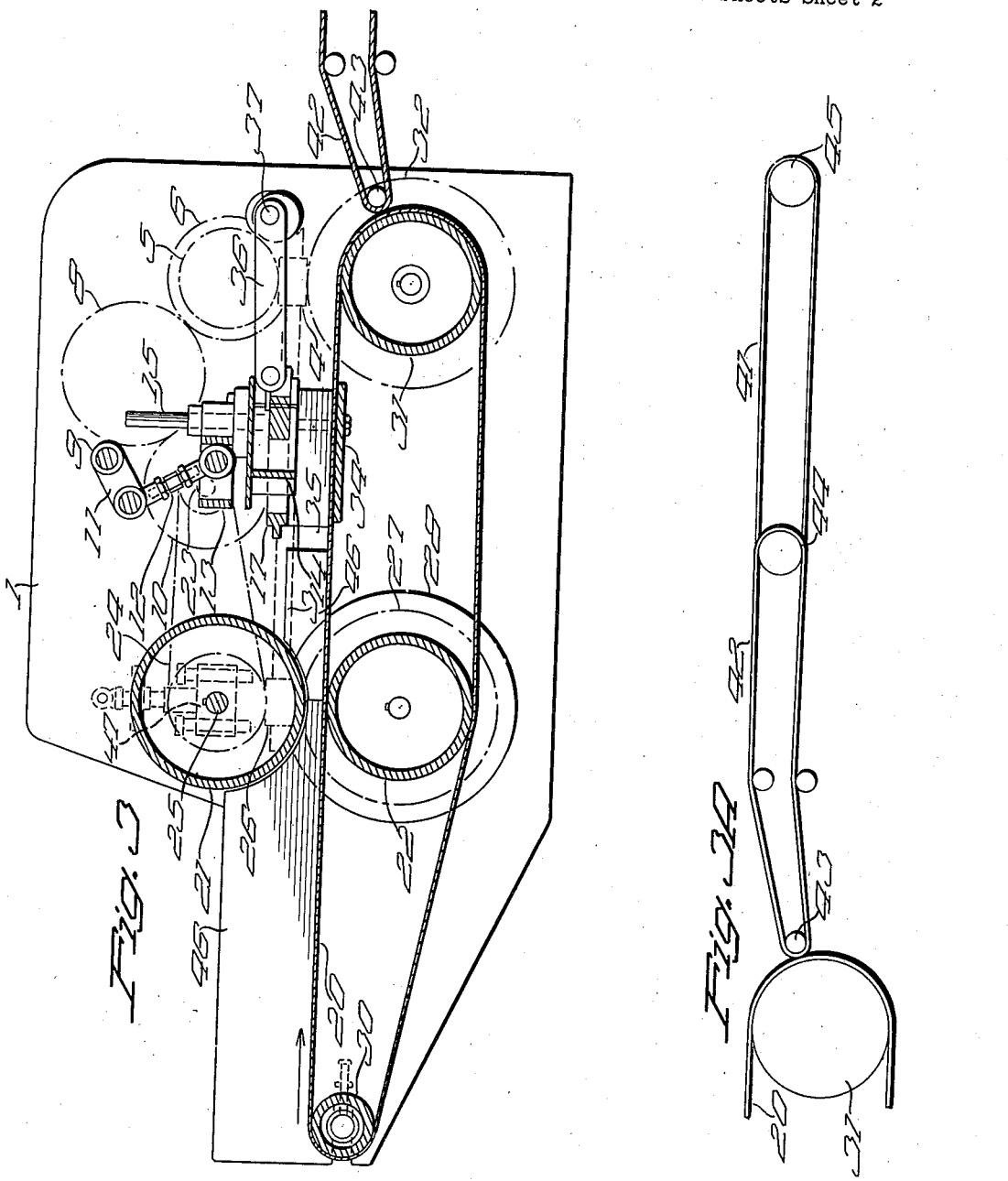

May 13, 1941.  D. W. SMITH  2,241,890
DOUGH DIVIDER
Filed Feb. 24, 1940  5 Sheets-Sheet 3
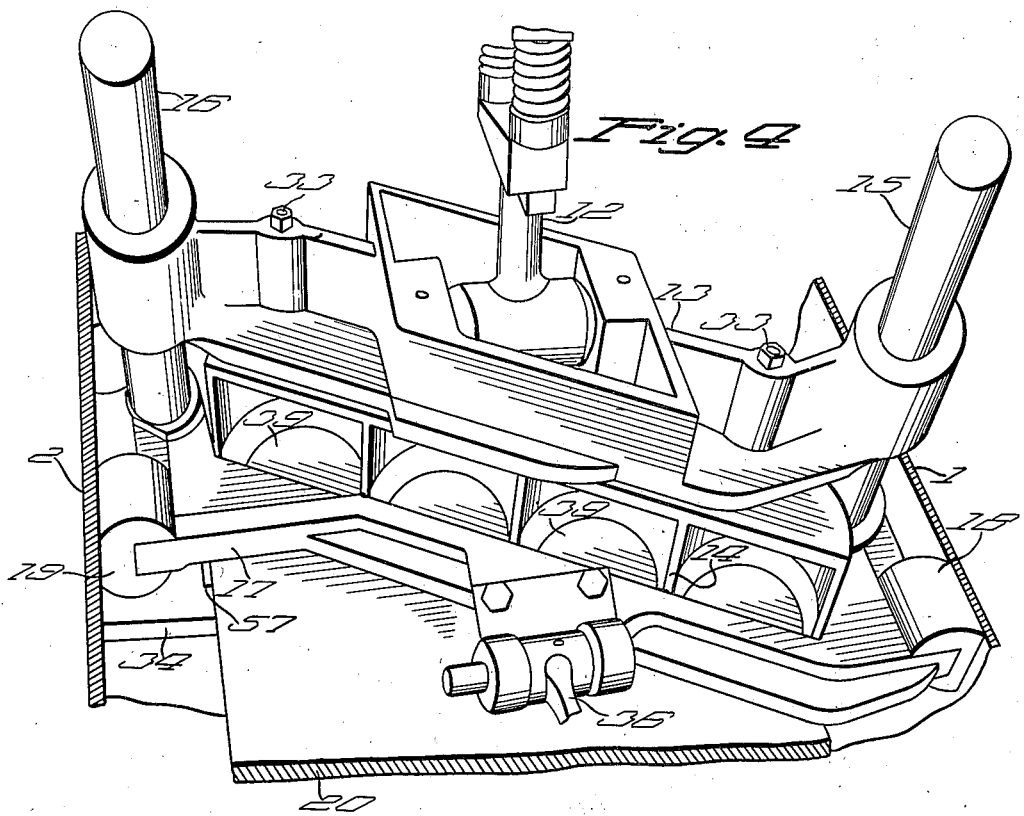
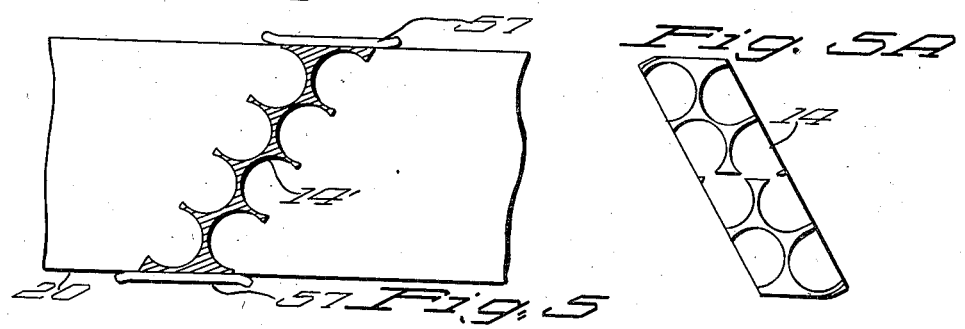
Inventor
Dennis W. Smith

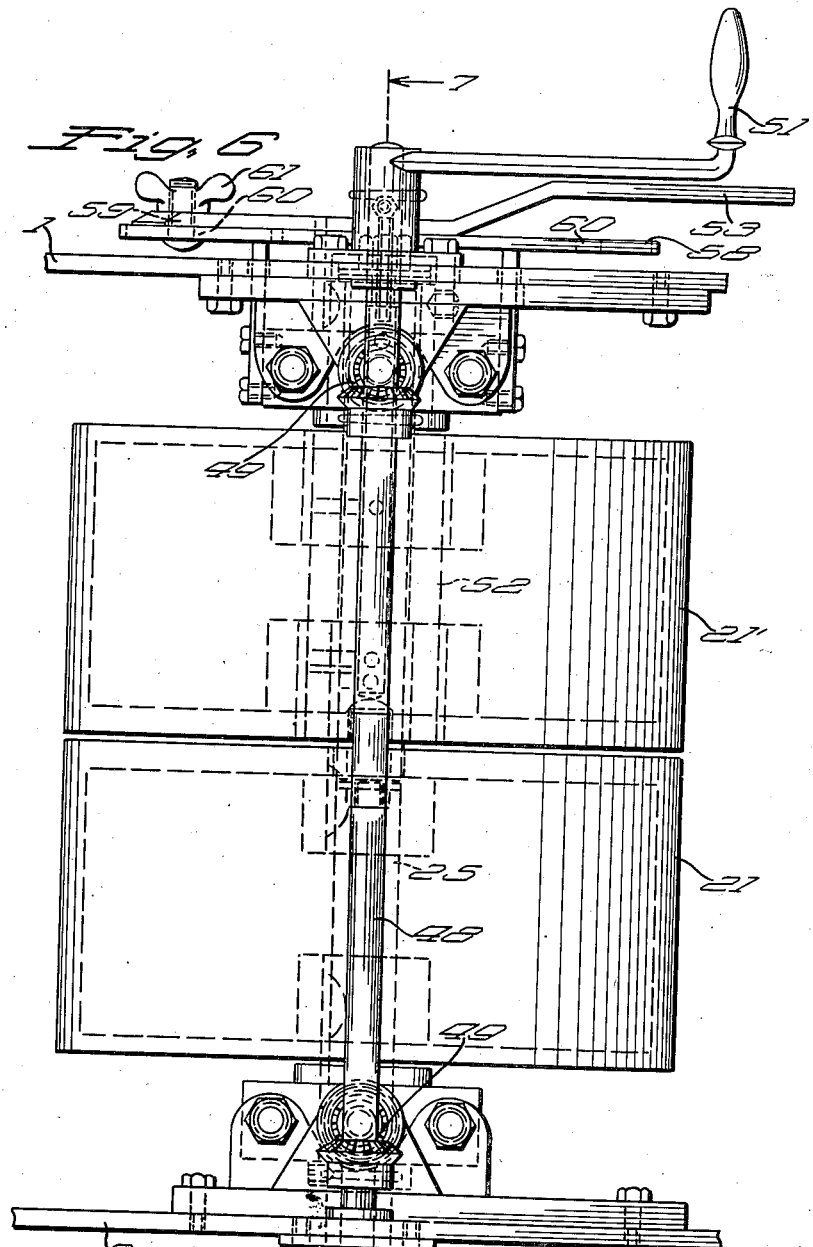

May 13, 1941.  D. W. SMITH  2,241,890
DOUGH DIVIDER
Filed Feb. 24, 1940  5 Sheets-Sheet 5
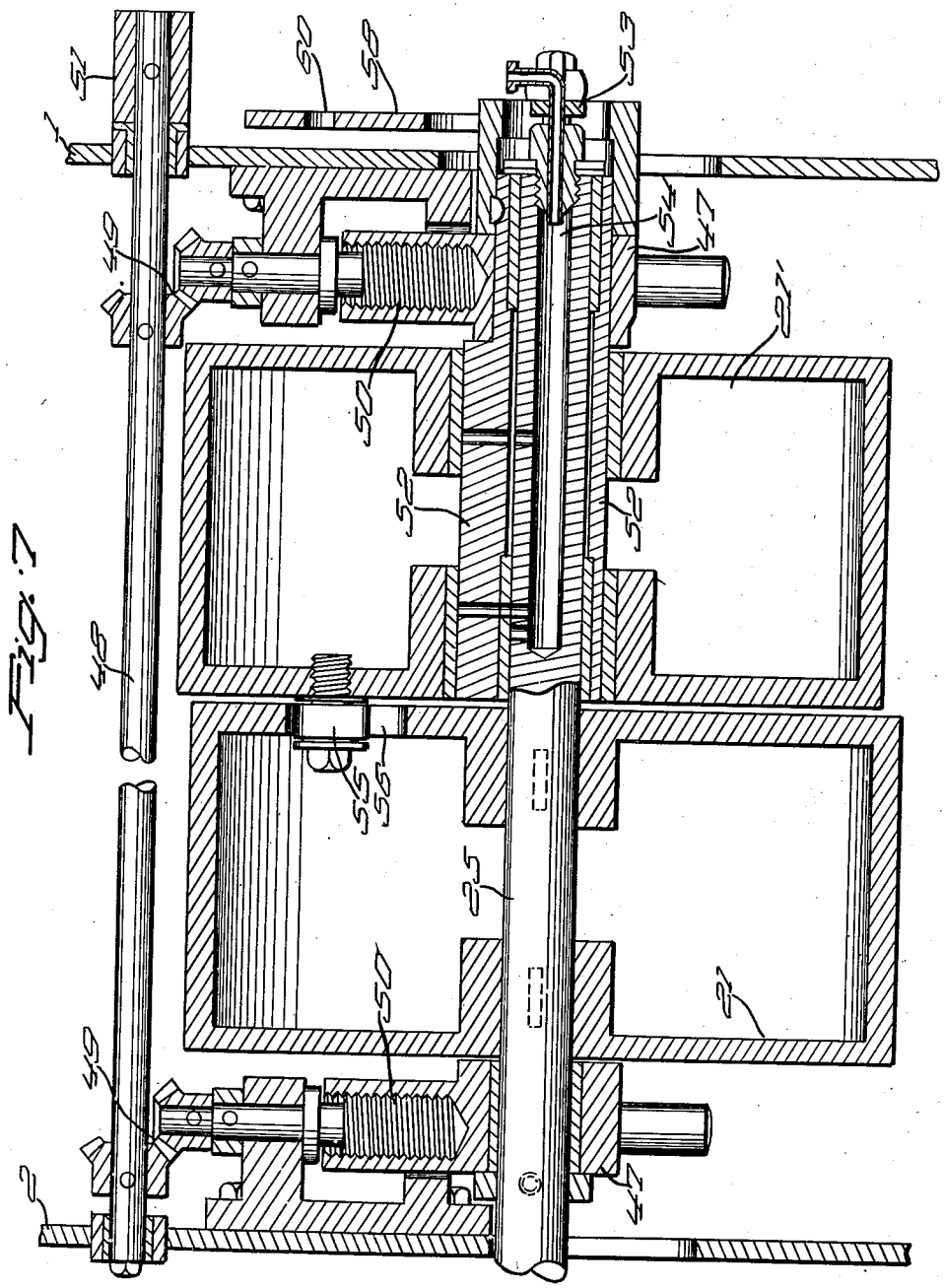
Inventor
Dennis W. Smith
By Rummler, Rummler & Davis
Attys Patented May 13, 1941

2,241,890

UNITED STATES PATENT OFFICE 2,241,890

DOUGH DIVIDER

Dennis W. Smith, Chicago, Ill., assignor to Colborne Manufacturing Company, Chicago, Ill., a corporation of Illinois Application February 24, 1940, Serial No. 320,585

4 Claims. (Cl. 107—24)

This invention relates to machines for rolling and dividing webs of plastic material, such as sheeted dough, for use in the manufacture of pies and especially to machinery for simultaneous action on two sheets of dough, of which one sheet is made heavier than the other.

Objects of the invention are the provision of adjustable multiple dough rolling cylinders in cooperation with a multiple section dough stamping die for coincident delivery of upper and lower pie crust dough discs.

The purposes of the invention are accomplished by means of the construction shown in the drawings, wherein:

Figure 1 is a plan view of the improved dough dividing machine, with delivery belts shown broken away, and omitting an overhead crank shown in Fig. 3 which is used for vertically reciprocating the die head.

Fig. 2 is a bottom plan of one form of stamping die.

Fig. 3 shows the machine in longitudinal section as indicated by line 3—3, Fig. 1.

Fig. 3A is a fragmentary detail view of a pair of conveyor belts at the delivery end of the machine.

Fig. 4 is a perspective view of the stamping die unit.

Fig. 5 is a plan diagram, with the stamping die in section, to show the relationship of the stamping die and movable side walls for confining to a belt the material operated upon.

Fig. 5A is a bottom plan of an alternate form of stamping die having a central slot for accommodation of a separating partition.

Fig. 6 is a plan view of a pair of adjustable dough rolling cylinders.

Fig. 7 is a longitudinal section of the adjustable dough rolling cylinders, as indicated by line 7, Fig. 6.

Structurally, the machine includes a travelling belt for conveying dough from a mixing machine to multiple dough rolling and stamping units. At the under side of the belt is a single cylinder, which cooperates with a pair of adjacent cylinders located above the belt for flattening the dough into two sheets of different thickness. The upper cylinders are adjustable vertically from the belt and with relation to each other. A center partition is located above the belt and extends from the cylinders to the die stamping unit and in the usual arrangement of the machine a continuation of the center partition is carried by the stamping unit in order to maintain separation of the two sheets of dough. The die is so formed as to force all the dough into divided sections and is usually slotted to accommodate the partition continuation.

The machine shown in the drawings is supported by side frames 1 and 2, the first of which may support an electric motor, not shown, for turning a main drive shaft 3, Fig. 1. The drive shaft 3 carries a worm 4 meshing with a worm wheel 5. The shaft of worm wheel 5 also carries fast a gear 6 meshing with an intermediate gear 8. Gear 8 meshes with a pinion 9, Fig. 3, and a gear 10. Pinion 9 operates a crank 11, and thereby, through an adjustable connecting rod 12, vertically reciprocates a die carrying head 13. A centrally partitioned die is indicated by numeral 14, and numeral 14' indicates a die of the type used when it is desirable to dispense with the central partition. The die carrying head 13 is guided for vertical movement by posts 15 and 16, Fig. 4, extending upwardly from a casting 17 which is horizontally reciprocated in channeled rails 18 and 19 by crank 36.

This arrangement regularly moves the die down against a belt 20 and also causes die 14 to travel momentarily with belt 20 before returning to the starting point. The belt travels in the direction indicated by the arrow in Fig. 3 and receives motion from pulley 31, driven by worm wheel 32 in mesh with worm 4.

The upper pair of dough rolling cylinders 21 and 21' are driven by gear 10 on shaft 23. For this purpose the shaft carries a sprocket driving a chain belt 24 leading to a sprocket fast to cylinder supporting shaft 25.

For the purpose of shifting both of the upper rolling cylinders 21 and 21' toward and away from the belt, shaft 25 is supported in vertically adjustable journals 47. The position of these journals is regulated by shaft 48, Fig. 7, through bevel gears 49 and screw 50. Shaft 48 is operated by means of a handle 51. Thus, the thickness of both dough sheets may be uniformly increased or decreased.

For the purpose of producing a change in relative thickness between the two sheets of dough, cylinder 21' rotates on an eccentric 52 which is adjusted angularly around shaft 25 by means of a handle 53. Handle 53 has an arcuate movement across the face of a fixed dial 58. A bolt 59 is carried by handle 53 and passes through an arcuate slot 60 in dial 58. A wing nut 61 cooperates with bolt 59 to retain handle 53 in any desired position, the adjustment of roller 21' relative to roller 21 being indicated by the position of handle 53 on dial 58. Lubrication of the eccentric bearing surfaces is effected through a conduit 54 in the supporting shaft.

Cylinder 21 is fast on the drive shaft 25, and in turn drives cylinder 21' by a pin and slot connection represented by the numbers 55 and 56.

The lower cylinder 22 is driven by worm 26 on drive shaft 3 through a worm wheel 27 fast to cylinder 22. Flanges 28 and 29 of cylinder 22 fit the edges of the belt to confine the dough thereon.

The belt 20 is tensioned by an adjustment of a left end idler 30, Figs. 1 and 3, and is driven by the right hand belt pulley 31, the shaft of which carries worm wheel 32, meshing with worm 4 on the drive shaft 3.

When the stamping die, secured to the die carrying head 13 by bolts 33, is in its lowermost position, the belt 20 is supported by a shelf 34, Fig. 3, carried by and movable with the casting 17. Walls 57 on shelf 34 are located at the sides of the belt adjacent the stamping unit to prevent lateral spreading of the dough during engagement by the stamping die. A center partition wall 46, Fig. 1, prevents overlapping of the dough sheets. A continuation 35 of the center partition extends down from die supporting casting 17 to the belt, and die 14 is centrally slotted to ride vertically thereon. The cutter apertures of the die are provided with downwardly inclined, round edged walls, suitable for forcing all the dough into the apertures. Fore and aft reciprocation of the stamping unit is effected by a crank 36. The crank shaft 37 carries fast a pinion 38, receiving motion from the gear 6 with which the pinion 38 meshes.

Fixed disc shaped strippers 39 carried above the sheets of dough by the casting 17, as shown in Fig. 4, prevent rising of the cut dough with the die.

A pair of delivery belts 41 and 42, carried by rollers 43, 44 and 45 cooperate with belt 20 in removing cut forms from the machine.

During operation of the machine, dough is fed from a hopper to each side of the center partition 46, and is carried by belt 20 between the dough rolling cylinders 21, 21' and the cylinder 22, being sheeted thereby to the required thickness. One of the cylinders is raised above the others to give the dough layers a difference in depth. The cutting apertures are arranged in diagonal rows to minimize the space between the discs, and thereby assist the inclined blunt edged walls of the die in pressing all the dough into the discs. Vertical reciprocation of the die carrying head 13 is effected by crank 11. The crank 36 moves the die with the belt during contact therewith. The cut dough forms are removed from the delivery end of the machine by belts 41 and 42. The distance of the rolling cylinders 21 and 21' from the belt 20 may be regulated by handle 51, and variation in the respective distances of the cylinders is obtainable through rotation of eccentric 52.

I claim:

1. In a machine of the character described comprising a belt for carrying the sheeted material operated upon and means for driving the belt, a stamping unit including a structure surrounding one course of the belt and having on one side a supporting shelf and carrying on the opposite side of the belt a stamping die, means for effecting reciprocation of the die perpendicularly to the belt, said stamping die having formed therein a central longitudinal slot, and a partition fitted within said slot, said partition being mounted to abut said belt and to be fixed with reference to the reciprocation of the die toward and away from the belt.

2. A machine of the character described, comprising a belt for carrying the sheeted material operated upon and means for driving the belt, a die stamping unit including a structure surrounding one source of the belt and having on one side of the belt a belt supporting shelf and carrying on the opposite side of the belt a stamping die, said stamping die having formed therein a central longitudinal slot lengthwise of the belt, said stamping die including a plurality of oppositely faced cutting forms each one of which is formed to separate approximately one-half of a disc, walls located at the sides of the die stamping unit between which the sheeted material passes, means for effecting reciprocation of the stamp perpendicularly of the belt, means for causing the stamp to travel with the belt, on the separating stroke of the die and in the reverse direction when the die moves away from the belt, stripping elements mounted to fit within said oppositely faced elements and relatively fixed with reference to the reciprocation of the die toward and away from the belt, and a partition extending from the die unit to the belt and fitted within said central slot, said partition being relaively fixed with reference to the reciprocation of the stamping die toward and away from the belt.

3. A machine of the class described having a frame structure upon which is mounted for horizontal reciprocation thereon a support for a die-carrying head, a die-carrying head mounted on said support for vertical reciprocation thereon, a drive mechanism including connections simultaneously effecting horizontal reciprocation of the support and vertical reciprocation of the die-carrying head thereon, a stamping die secured to the die-carrying head, said stamping die having spaced sets of cutting forms, and a partition on said support located between said sets of cutting forms.

4. A dough dividing machine including a conveyor for sheet material, a stamping unit having separate spaced sets of cutting forms, means for reciprocating the stamping unit relatively to the conveyor, a frame structure, and a partition mounted on said frame structure in position to extend between the spaced sets of cutting forms.

DENNIS W. SMITH.